Patented May 30, 1950

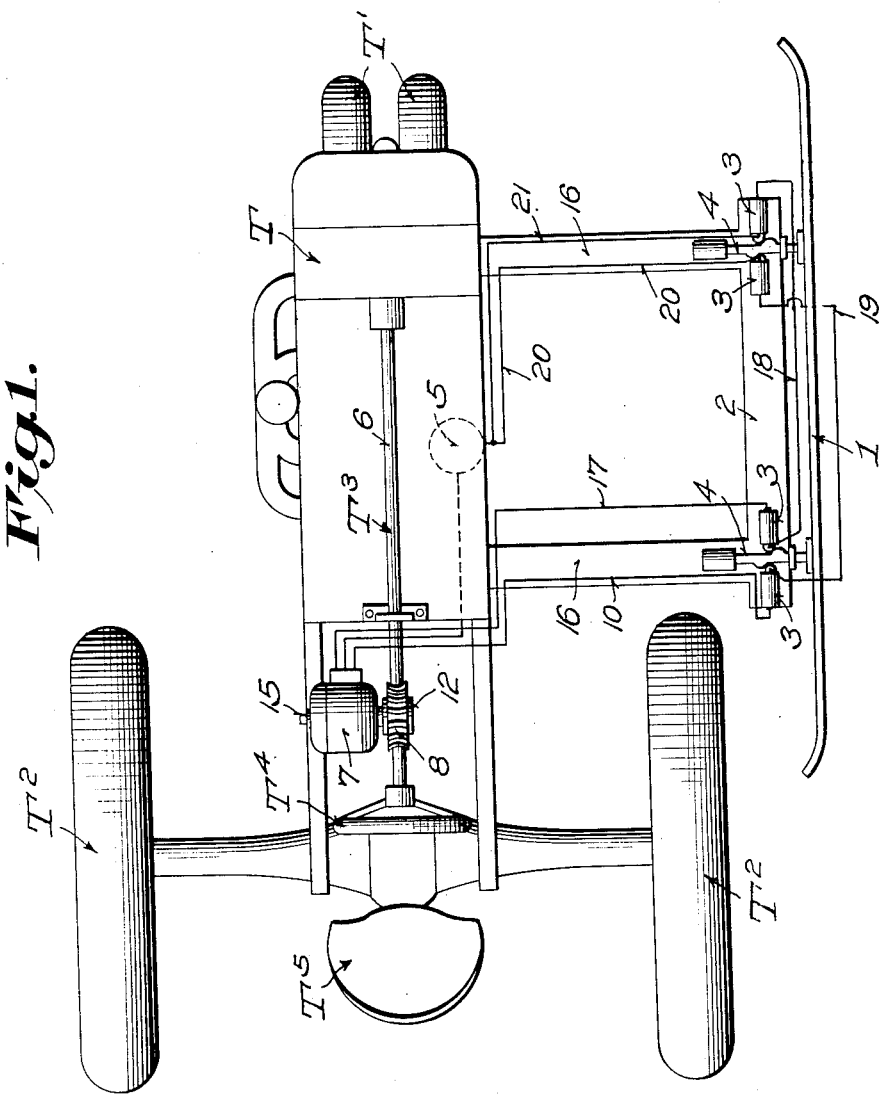

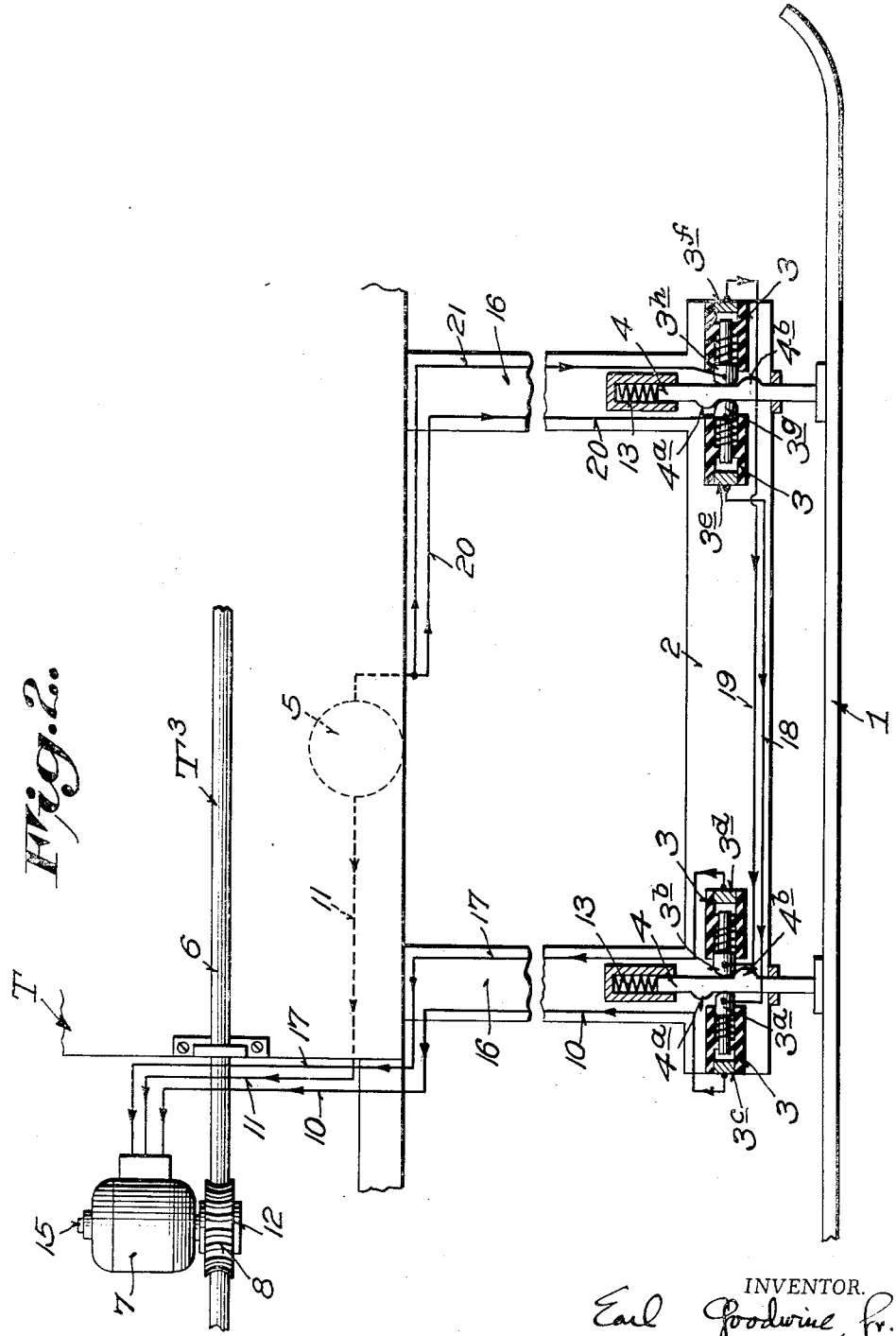

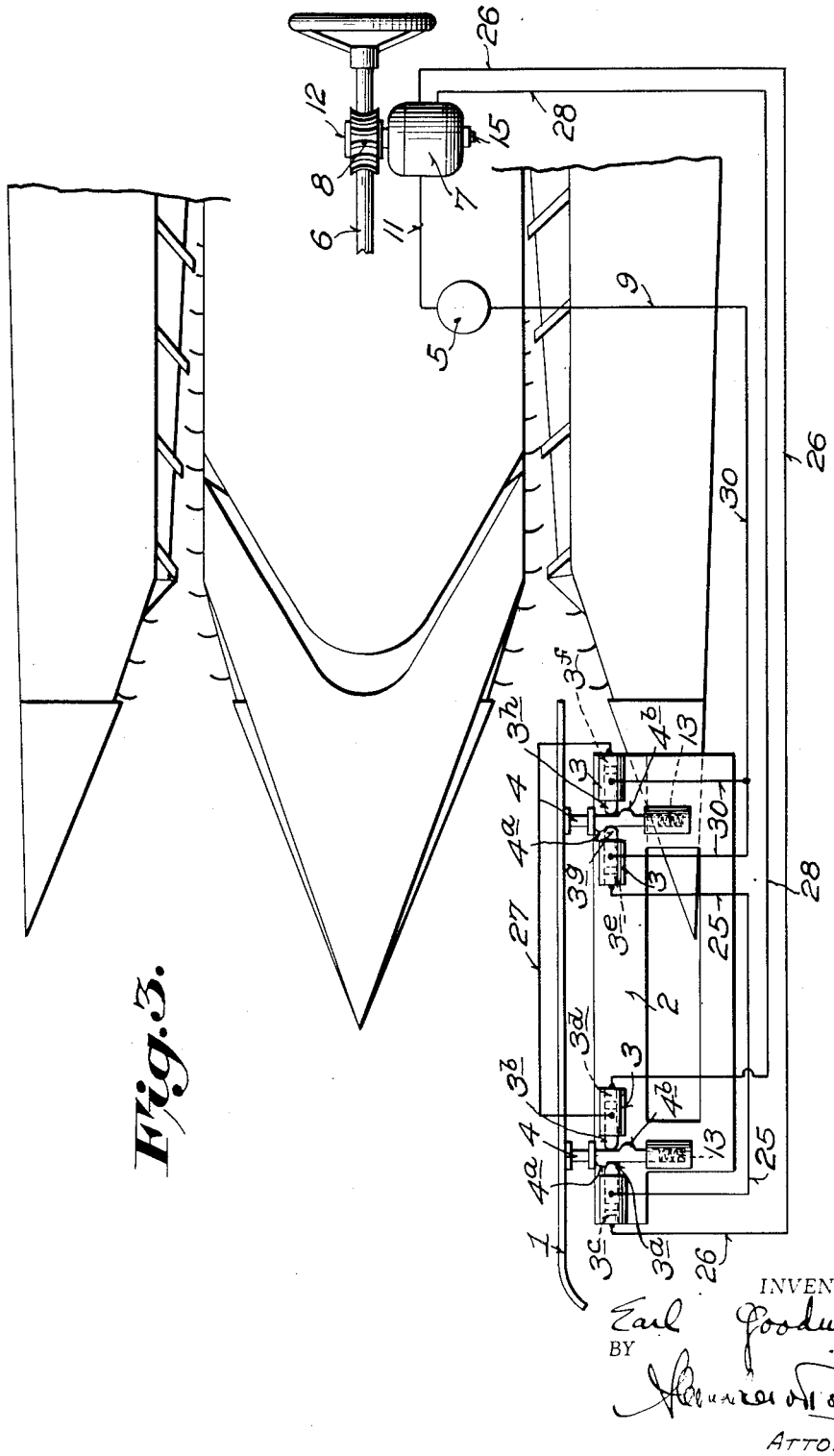

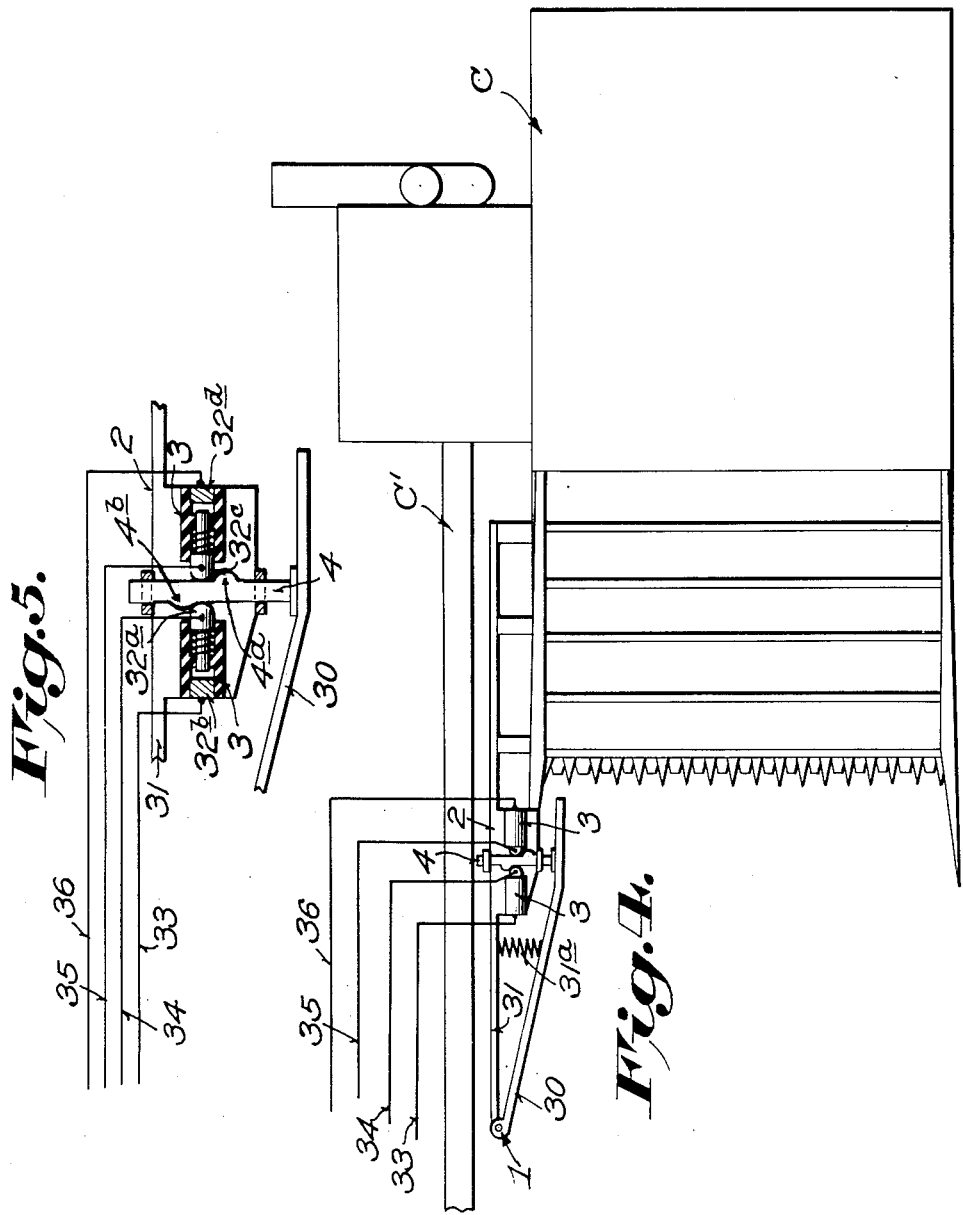

2,509,914

UNITED STATES PATENT OFFICE 2,509,914

AUTOMATIC STEERING DEVICE

Earl Goodwine, Jr., Hoopeston, Ill.

Application March 4, 1949, Serial No. 79,619

5 Claims. (Cl. 318—286)

This invention relates to self-propelled agricultural machines, such as tractors, or the like, and the primary object thereof is the provision of means for automatically steering a vehicle parallel with a formed guide, such as a row of corn stalks or other grain, or a plow furrow, or any other guide that may be adaptable to this particular automatic steering device.

Another object is to provide a machine that can be sold at a sufficiently low price to reach the market, so that the average farmer may make his work of harvesting grain, plowing, cultivating, etc. easier and more accurate, placing upon the automatic steering device the task of holding the vehicle in the correct position with respect to the guide, row, or line being followed, such as the corn row, etc.

A further object is to provide an automatic steering device which has been successfully used in operating a mechanical corn picker, the same giving the advantages of (1) less work or strain on the part of the operator by removing the tediousness of holding the corn picker exactly on the corn row; (2) picking a greater amount of corn in a given time by avoiding the difficulties arising when picker fails to follow the corn row; (3) leaving less corn in the field as a result of always being disposed on the corn row; and (4) less damage to the corn picker by avoiding the difficulties encountered by not always following the corn row, such as clogging the picker with broken corn stalks.

Other objects of the invention are to provide a vehicle that can be automatically guided by using a reversible electric motor in conjunction by a transmission connected with the steering apparatus of the vehicle, said motor being wired to a source of power such as a battery or generator and wired to a "finder" as hereinafter described. The movement of the finder in or out makes electrical contacts which causes the motor to turn in the desired direction to guide the vehicle. An outward movement of the finder closes the switches, causing the motor to rotate in one direction, thus turning the vehicle in one direction, and an inward movement of the finder closes the switches that rotate the motor in the other direction, thus turning the vehicle in the other direction.

Other minor objects of the invention will be hereinafter set forth.

I will explain the invention with reference to the accompanying drawings which illustrate several practical embodiments thereof, to enable others familiar with the art to adopt and use the same, and will summarize in the claims the novel features of construction, and novel combinations of parts, for which protection is desired.

In said drawings:

Figure 1 is a top plan view of one embodiment of my novel automatic steering device applied to a farm tractor or the like, the same showing the arrangement of switches and the electrical circuit which operates the steering post of the vehicle.

Fig. 2 is an enlarged view of the device, showing more particularly the wiring diagram.

Fig. 3 is a plan view, showing my novel steering device mounted upon a corn picker of conventional type, showing the switches and the wiring diagram for automatically rotating the steering column.

Fig. 4 is a top plan view showing my novel steering device applied to a tractor-drawn combine or the like, the same embodying the use of only one switch, instead of two as in the previous figures.

Fig. 5 is an enlarged detail view of the switch shown in Fig. 4.

As shown in Figs. 1 and 2, the tractor T is of conventional type, having the customary steering wheels T' and driving wheels T2, the steering wheels T' being actuated by a conventional steering post T3 having a steering wheel T4 at its upper end adjacent the driver's seat T5. The above-named parts, being purely conventional, form no part of my present invention.

Upon the steering post T3, at any portion thereof, but preferably adjacent the steering wheel T4, is a worm 8 meshing with a worm gear 12 on the shaft 15 of a reversible electric motor 7 mounted on the frame of tractor T in any desired manner. The tractor T also carries a source of electric power 5 which may be a generator or battery of desired capacity.

Extending laterally of tractor T are a pair of struts 16 which, as shown, are preferably disposed in advance of the driving wheel T2 at one side of the tractor frame, and are horizontally disposed and spaced apart a distance approximately ⅓ the length of the tractor T. However, any other desired spacing may be used. The outer ends of the lateral struts 16 are connected together by a frame member 2.

On the frame member 2 opposite each of the struts 16 is an axially movable bar 4, preferably mounted in bearings of any desired type so that the same may move axially, the bars 4 being normally urged outwardly of the struts 16 by means of springs 13 or the like interposed between their inner ends and fixed members of the frame. The outer ends of the bars 4 carry a feeler 1 in the form of a metal or other strip having its ends rounded towards the tractor, said feeler being adapted to directly engage the stalks of a row of crops or the like which the tractor is to parallel, maintaining a spaced relation with respect to the said row.

Each bar 4 carries on one side a cam surface $4a$ and on the other side an axially spaced cam surface $4b$, adapted when the bar 4 is shifted to engage and actuate a related plunger $3a$ or $3b$, which plungers are mounted, as shown in Fig. 2, at opposite sides of the related bar 4 and forming the movable contacts of electric switches, which switches are normally maintained by springs in "open" position when the plungers $3a$ and $3b$ are in the positions shown in Figs. 1 and 2, i. e., are not engaged by their respective cam surfaces $4a$ and $4b$.

Each plunger $3a$ cooperates with a fixed contact $3c$, which contacts are connected in series through the battery or generator 5 to one terminal of the reversible motor 7. For instance, the contact $3c$ at the left end of Fig. 2 is connected by a wire 10 directly to one terminal of the motor 7, while contact $3d$ which cooperates with the plunger $3b$ at the left side of Fig. 2 is connected by a wire 17 to the opposite or reversing terminal or reversible motor 7. The plunger $3a$ at the left end of Fig. 2 is connected by conductor 18 to the fixed contact $3e$ at the right end of Fig. 2 while the plunger $3b$ is connected by conductor 19 to the fixed contact $3f$ at the right end of Fig. 2. The fixed contact $3e$ cooperates with a plunger $3g$ while fixed contact $3f$ cooperates with the plunger $3h$. Plunger $3g$ is directly connected by conductor 20 with one terminal of the battery or generator 5; and plunger $3h$ is electrically connected by conductor 21 to the same terminal of the battery or generator 5; the other terminal of the battery or generator 5 being connected by conductor 11 to the return terminal of the motor 7.

By the above construction, when the feeler 1 is moved outwardly by the springs 13, plunger $3a$ will engage contact $3c$ and plunger $3g$ will engage contact $3e$ and thus the current from the battery or generator 5 will be completed to the motor 7 to rotate the worm 12 in one direction through the conductors 20, 18 and 10 respectively, the return circuit to the battery or generator 5 being the conductor 11. When the feeler 1 is moved inwardly, the plunger $3b$ will engage contact $3d$ and the plunger $3h$ will engage contact $3f$, and the circuit from the battery or generator 5 will be completed to the motor 7 to rotate the worm 12 in the opposite direction through the conducors 21, 19 and 17 respectively, the return line to the battery or generator 5 being conductor 11.

Thus, in operation, when the tractor is moved along the row of crops or the like with the feeler 1 slidably engaging the stalks, the tractor will be automatically steered to maintain a parallel relation by the shifting of the feeler 1 inwardly or outwardly. As long as the tractor is running at the proper distance parallel with the row, the plungers of the switches will be disengaged from their respective cam surfaces, or will be in neutral position, and the steering motor 7 will thereby be inoperative.

In following a spaced row, it is necessary that the finder 1 be of sufficient length so that a part of the finder is at all times in contact with one or more of the objects forming the row. By the use of the two switches $3a$ and $3c$ and $3e$ and $3g$ in series, and the use of the two switches $3b$ and $3d$ and $3f$ and $3h$ in series, it is obvious that unless both switches of each series are closed the steering device will be inoperative. Thus, in event the front end of the feeler 1 should strike an obstacle which is offset from the row of stalks or the like being followed, only the leading switch of the series would be closed while the other switch of the series would remain open, and thus the steering post T3 would not be rotated, and the feeler 1 would thereafter spring back into contact throughout its entire length with the row being followed without changing the direction of travel of the vehicle. This is an important feature when the vehicle is traveling over ground in which bushy weeds are growing between the rows of crops or the like.

The transmission from the electric motor 7 to the steering shaft T3 could be the worm and worm gear 8 and 12, or could be any other type of transmission that has the desired gear ratio for steering the vehicle properly.

In the modification shown in Fig. 3, an automatic steering device is applied to a mechanical corn picker of conventional type, the corn picker having a steering post 6 carrying the worm 8 engaging the worm gear 12 carried by the motor 7, as in the preceding figures, and the picker also carries a battery or generator 5 of other source of electric power. In this modification, the feeler 1 is disposed directly in line with one of the snapping rollers, so as to engage the row immediately in advance of one of the rows being picked. In this modification, the bars 4 which carry the feeler 1 are mounted upon a frame member 2, the bars 4 being urged inwardly of the machine by the springs 13 in the same manner as previously described, and each bar 4 is provided, as in the preceding modifications, with the cam surfaces $4a$ at one side thereof and the cam surfaces $4b$ at the opposite side thereof. The cam surfaces $4a$ at the left end (Fig. 3) operate a plunger $3a$ cooperating with a fixed contact $3c$, while the cam surface $4b$ of the same bar 4 operates the plunger $3b$ cooperating with the fixed contact $3d$. The cam surface $4a$ of the other cam bar actuates a plunger $3g$ cooperating with fixed contact $3e$ while the cam surface $4b$ operates a plunger $3h$ cooperating with a fixed contact $3f$.

In this modification, plunger $3a$ is connected by conductor 25 to the fixed contact $3e$, while the fixed contact $3c$ is connected by conductor 26 to one terminal of motor 7. The plunger $3b$ is connected by conductor 27 to the fixed contact $3f$, while the contact $3d$ is connected by conductor 28 to the reversing terminal of motor 7. The plungers $3g$ and $3h$ are connected by conductor 30 to one terminal of the battery or generator 5, the other terminal of which is connected to the return contact of motor 7 to complete the circuit.

By the above construction, when the feeler 1 is moved inwardly of the corn picker by action of the springs 13, the cam surfaces $4b$ will close the switches $3b$—$3d$ and $3h$—$3f$ and the circuit from one terminal of the battery or generator 5 will be completed through lines 30—27—28 to one terminal of the motor 7. When the feeler 1 is pushed outwardly, or away from the axis of the corn picker, the cam surface $4a$ will close the switches $3a$—$3c$ and $3g$—$3e$, thereby closing the circuit to the opposite or reversing contact of the motor 7 from the battery or generator 5, through the lines 30—25—26 leading to the motor 7. The conductor 11 is the return line from the motor to the battery or generator, irrespective of which set of switches is closed.

The operation of the above is the same as previously described with respect to Figures 1 and 2, and therefore needs no further description herein.

In the modification shown in Figs. 4 and 5, the invention is illustrated in connection with a tractor-drawn combine, and differs primarily from the preceding modifications by utilizing only one bar 4 instead of a pair of bars, the bar 4 being mounted upon a pivoted feeler 30 mounted upon a strut 31, the feeler being substantially in alignment with one edge of the uncut grain for the purpose of automatically maintaining the combine parallel in its movement to the uncut edge. Feeler 30 is normally urged inwardly of the machine by means of a spring 31a. In this modification the bar 4 is provided with a cam surface 4a and a cam surface 4b. The cam surface 4a actuates plunger 32c carried by the strut 31 and cooperates with a fixed contact 32d. The cam surface 4b cooperates with a plunger 32a which cooperates with fixed contact 32b.

In this modification the combine C, as above stated, is tractor-drawn by means of a draw bar C' which would be attached to the tractor, and the tractor would carry the steering post shown in the other figures with the reversing motor 7 and source of electricity 5; however, if the combine is drawn so that the feeler 30 is shifted outwardly (Fig. 5) the cam surface 4a would shift the plunger 32c to engage the fixed contact 32d and the electric circuit to the reversing motor would be closed through the wires 35 and 36. However, if the feeler 30 is forced by the spring 31a inwardly or in the opposite direction, cam surface 4b would shift the plunger 32a against the fixed contact 32b and the circuit to the opposite contact of the reversing motor would be closed through the lines 33 and 34 respectively. Thus, the operation is identical in this modification with those shown in the preceding modification, the same utilizing but one cam bar 4 instead of two parallel bars.

I do not limit my invention to the exact forms shown in the drawings, for obviously changes may be made therein within the scope of the claims.

I claim:

1. In combination with a self-propelled wheeled vehicle having a steering post and a source of electric energy; an automatic steering device comprising a horizontal feeler carried by the vehicle above the ground level and adapted to engage a row of crops or the like; means for normally yieldably urging the feeler into engagement with said row while permitting the feeler to be shifted in the opposite direction by pressure of the feeler against the row of crops; a reversible motor and connections for rotating the steering post in either direction; switch means actuated by the feeler; and an electric circuit including the switch means, source of electric energy, and the motor whereby when the switch means are open the motor is idle, and whereby when the feeler is shifted in one direction the switch means will be closed to rotate the steering post in one direction, and whereby when the feeler is shifted in the opposite direction the switch means will be closed to rotate the steering post in the opposite direction.

2. In a combination as set forth in claim 1, said switch means comprising a bar movable with the feeler and having spaced cam surfaces on opposite sides; and plungers at opposite sides of the bar normally separated from fixed contacts and adapted to be actuated when the cam surfaces are positioned thereover to close the switches.

3. In combination with a self-propelled wheeled vehicle having a steering post and a source of electric energy; an automatic steering device comprising a horizontal frame carried by the vehicle above the ground level; a pair of parallel spaced bars carried by the frame and axially movable transversely of the movement of the vehicle; a horizontal feeler supported by the outer ends of the bars and adapted to engage a row of crops or the like; means for normally yieldably urging the bars outwardly of the frame while permitting the bars to be shifted inwardly of the frame by pressure of the feeler against the row of crops; a reversible motor and connections for rotating the steering post in either direction; switch means actuated by the bars respectively; and an electric circuit including the switch means, source of electric energy and the motor, whereby when the switches are open the motor is idle, and whereby when the bars are shifted outwardly the switches will be closed to rotate the steering post in one direction, and whereby when the bars are shifted inwardly the switches will be closed to rotate the steering post in the opposite direction.

4. In a combination as set forth in claim 3, said bars having spaced cam surfaces on opposite sides; and said switches comprising plungers at opposite sides of the bars normally separated from fixed contacts and adapted to be actuated when the cam surfaces are positioned thereover to close the switches.

5. In a combination as set forth in claim 3, said bars having spaced cam surfaces on opposite sides; and said switches comprising plungers at opposite sides of the bars normally separated from fixed contacts and adapted to be actuated when the cam surfaces are positioned thereover to close the switches; the switches at the same sides of the respective bars being connected in series in the electrical circuit, whereby closing of one related switch only by shifting of a feeler will fail to complete the circuit to the motor.

EARL GOODWINE, Jr.

No references cited.